INVENTOR.
Robert K. Sedgwick
BY
Cyril M. Hajewski
ATTORNEY

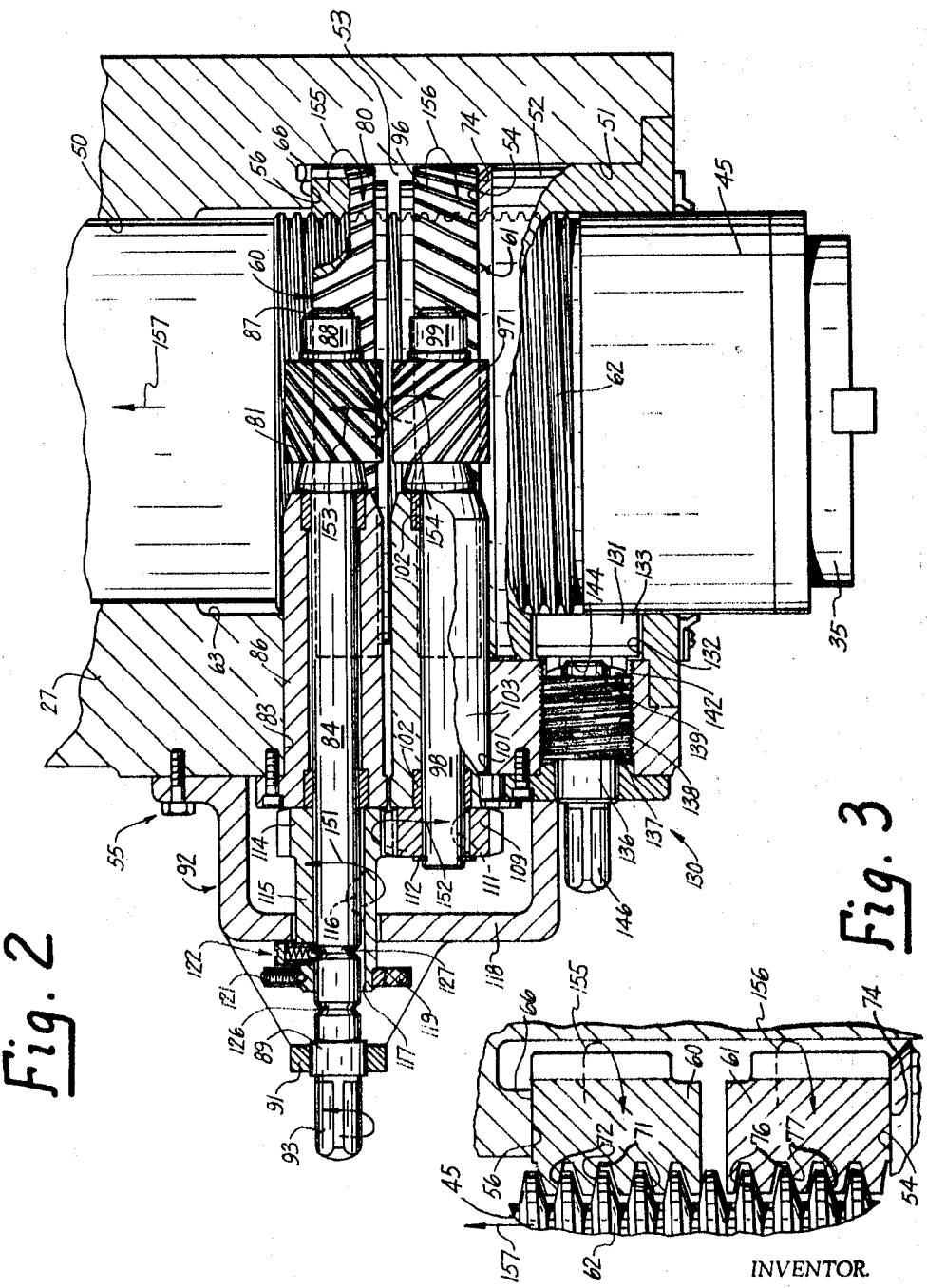

United States Patent Office 3,457,833
Patented July 29, 1969

3,457,833
QUILL ADJUSTING AND LOCKING MEANS
Robert K. Sedgwick, Waukesha, Wis., assignor to Kearney
& Trecker Corporation, West Allis, Wis., a corporation
of Wisconsin
Filed June 11, 1965, Ser. No. 463,288
Int. Cl. B23c *1/12, 3/00, 7/00*
U.S. Cl. 90—16                                8 Claims

ABSTRACT OF THE DISCLOSURE

The invention is disclosed in association with a spindle quill adapted to be axially movable for effecting the precise positioning of a spindle carried by the quill. The quill is provided with a threaded portion on which a pair of nut elements are movably engaged in spaced apart relationships. The uppermost nut element is disposed in abutting engagement with an inner upper abutment while the lower nut element is disposed in abutting engagement with a lower abutment. With this condition obtained, the portion of the quill between the abutments is under compression by two oppositely acting forces which serve to lock the quill against axial movement. To move the quill axially outwardly of the head for effecting the precise positioning of the spindle therein, the uppermost nut element is rotated independently of the lower nut element and in a direction to back it off from engagement with the upper abutment. This will operate to release the quill. Thereafter both the nut elements are rotated in unison in the same direction with the rotation of the lower nut element serving to effect the outward movement of the quill into a desired precise position. The simultaneous rotation of the upper nut element serves to maintain the released relationship of the upper nut element with respect to its associated abutment and also the lower nut element. With the quill located in a desired axial position, the upper nut element is rotated independently of the lower nut element into abutting engagement with the upper abutment thereby locking the quill in the precise adjusted position. A single actuating means is provided which is selectively engageable to effect the rotation of the one nut element or the simultaneous rotation of both of the nut elements. In conjunction with axial adjusting and locking means there is also provided a clamp which operates to apply a lateral force to the quill to maintain it free of lateral motion.

---

Figure 1:
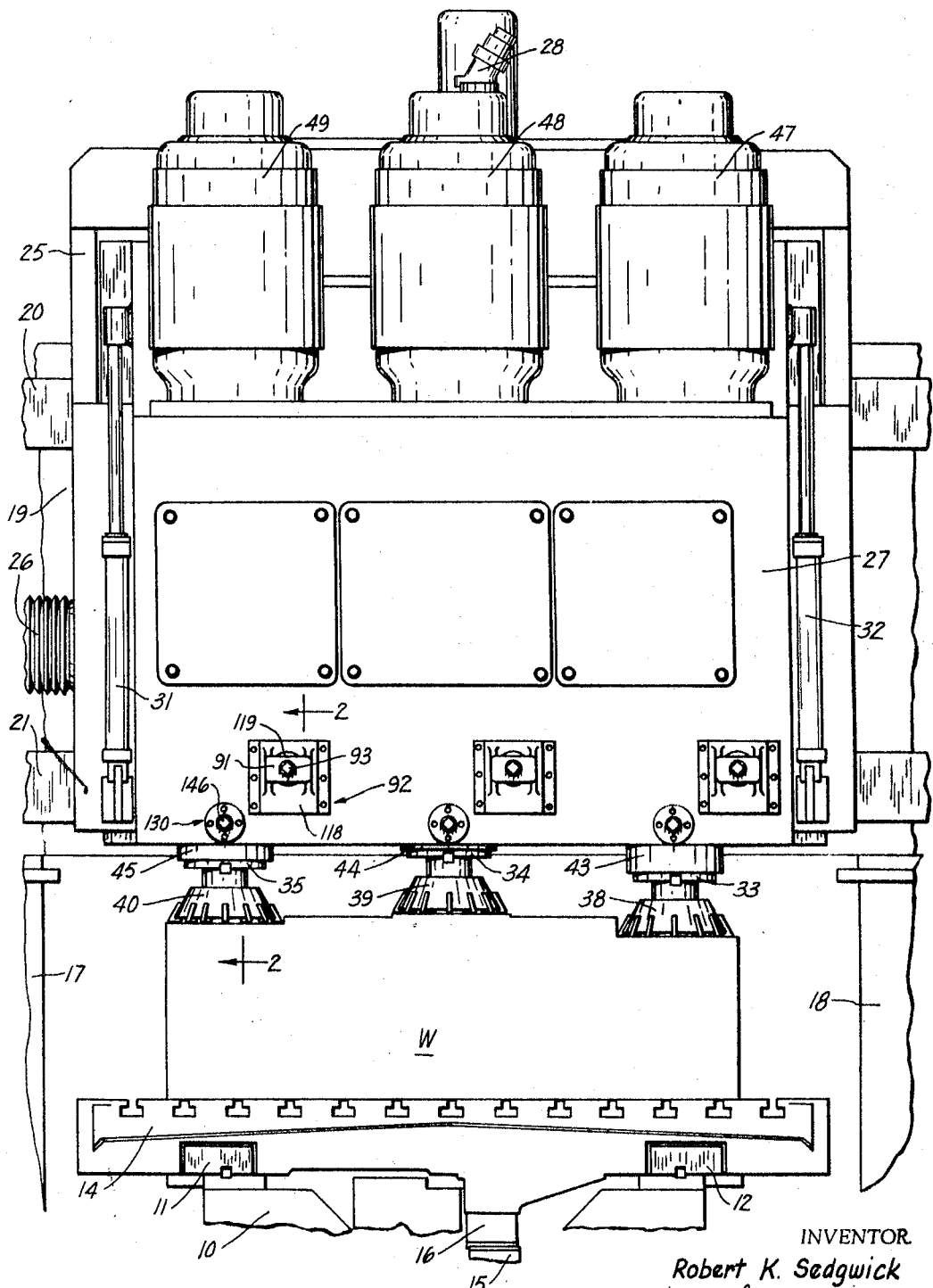

This invention relates generally to machine tools and more specifically to machine tools having axially adjustable spindles or spindle carrying quills.

A general object of the present invention is to provide an improved quill adjusting and locking mechanism.

Another object of the present invention is to provide a single mechanism which is operable to effect precise axial adjustment of a quill and also to lock the quill in its adjusted position.

Still another object of the present invention is to provide an improved arrangement for locking the quill against axial and lateral movement.

Yet another object of the present invention is to provide an improved quill adjusting and locking mechanism in which a releasable positive abutment arrangement is provided to prevent axial movement of the quill in either direction.

A further object of the present invention is to provide an improved quill adjusting and locking mechanism that is extremely effective but simple in operation, relatively inexpensive to manufacture and which does not impart additional movements or strains to the quill structure.

According to this invention, an improved combined actuating and clamping mechanism is provided for a movable element of a machine tool. A single mechanism performs the function of actuating the member in its path of travel for adjusting the position of its associated spindle relative to a workpiece and also functions to clamp the member in the selected position. The mechanism is especially adapted for application to an axially movable quill that rotatably supports a tool carrying spindle. It includes two nuts in threaded engagement with a thread provided on the peripheral surface of the quill. An abutment formed on the frame of the machine is provided for each nut to limit their movement away from each other. An operating mechanism is provided for rotating one of the nuts relative to the other, as well as for rotating both nuts in unison. When one of the nuts is independently rotated to move it away from the other and is tightened against its cooperating abutment, a compressive force is applied to the portion of the quill between the two nuts and the quill is clamped in position. This same nut may then be rotated in the opposite direction relative to the other nut for releasing the quill to permit its axial movement. The operating mechanism is also adapted to rotate both of the nuts in unison for moving the quill axially relative to its supporting structure for adjusting the position of its associated spindle relative to the workpiece.

The foregoing and other objects of the invention, which will become more fully apparent from the following detailed specification, may be achieved by the particular apparatus described herein by the way of example as illustrating a preferred embodiment of the invention, in connection with the accompanying drawings, in which:

FIG. 1 is a fragmentary view in front elevation of a machine tool showing the multiple spindle head structure in which the present invention has been incorporated;

FIG. 2 is an enlarged detail view partly in elevation and partly in longitudinal vertical section taken along the plane represented by the line 2—2 in FIG. 1, showing an axially adjustable quill and the adjusting and locking apparatus, as well as the lateral free applying member; and, FIG. 3 is a fragmentary view in vertical section showing the relationship that is established between the surface of the thread on the quill and the surfaces of the internal threads formed on the upper and lower driven nut gears, as well as the relationship of the nut gears to their respective abutments.

Referring more particularly to the drawings and specifically to FIG. 1 thereof, the machine tool there shown generally comprises a hollow bed or base 10 having longitudinally extending ways 11 and 12, which slidably support a table 14 on which a workpiece W to be operated upon is secured. The table 14 may be reciprocated longitudinally of the bed 10 on the ways 11 and 12 by suitable power means (not shown) operating through the usual appropriate transmission (not shown) that is connected to drive a pinion 15. The power driven pinion 15 is disposed in meshing engagement with a relatively long longitudinally extending rack 16 that is securely fastened to the undersurface of the table 14. Straddling the bed on either side thereof are a pair of upstanding columns 17 and 18 which carry a transversely extending cross rail 19 having horizontally disposed ways 20 and 21. The ways 20 and 21 slidably support a saddle 25 which is reciprocal thereon in a horizontal direction by power operation of the usual screw and nut mechanism, the screw 26 being partially shown. A multiple spindle headstock 27 is slidably supported for vertical movement on the saddle 25, being selectively moved thereon by a motor 28 which is carried by the saddle and operatively connected to the spindle headstock 27. The weight of the spindle headstock 27 is counterbalanced by a pair of hydraulic counterbalance mechanisms 31 and 32.

The spindle headstock 27 is provided with three equally spaced transversely disposed vertical spindles 33, 34 and 35, each of which is adapted to operate a tool, such as milling cutters 38, 39 and 40 respectively. The spindles 33, 34 and 35 are each rotatably supported in associated axially movable vertical quills 43, 44 and 45 respectively. A suitable well-known mechanism, such as a key and keyway arrangement (not shown), is provided to prevent each of the quills 43, 44 and 45 from rotating in the headstock 27. Power for rotating the individual spindles 33, 34 and 35 is provided by individual motors 47, 48 and 49 that are carried by the spindle headstock 27 and operably connected, in a well-known manner, to drive their associated spindles at infinitely variable speeds that are within the range of the spindle drive transmission (not shown). Each of the quills 43, 44 and 45 are constructed to be vertically adjustable so that the associated cutters 38, 39 and 40 respectively, may be precisely positioned with respect to a particular surface of the workpiece W, on which the cutters are to perform a work operation. The cutters 38, 39 and 40 may all be adjusted to the same vertical position with respect to the work supporting surface of the table 14, or each cutter may be individually adjusted to a different vertical position. It is also apparent that the workpiece W need not be a single workpiece, but may be three individual workpieces, each being operated upon by one of the spindles and each presenting surfaces located in the same or different horizontal planes.

Generally, it has been the practice to employ a gear and rack arrangement to effect axial movement of a spindle supporting quill. A separate clamp mechanism is then provided which operates to grip the quill by means of a split collar or the like. It has been found that clamp mechanisms which utilized the gripping principle of clamping adversely affect the bearing structures in which the spindle is rotatably supported. The grip type clamp imparts radially inwardly acting forces to the quill, which are transmitted by the quill to the outer race of the bearing structure. This imparted inwardly acting radial force tends to impose additional loads on the bearing which adversely affects the design characteristics of the bearing. As a result, the rotation of the spindle, rotatably supported in a bearing subjected to such forces, will not be about a true vertical axis. Clamp type devices also slip under heavy loads, and therefore, the cutting tools are not maintained in a precise adjusted position. In addition, the radially inwardly acting forces imparted to the bearing by the grip type of clamp mechanism, impairs the operating efficiency of the bearing and subjects the bearing to additional wear and early failure.

In accordance with the present invention, provision is made for adjusting the quill axially and for locking the quill and its adjusted positions by means of a single operative mechanism which operates to lock the quill axially between positive abutments. FIG. 2 illustrates a quill adjusting and locking mechanism 55 associated with the quill 45 and incorporating the features of the present invention. The tool carrying spindle 35, as previously mentioned, is supported within the quill in a well-known manner for rotation relative to the quill and for axial movement therewith. The quill 45 is supported for axial sliding movement within a vertical bore 50 formed in the headstock 27. A counterbore 51 is formed in the lower or outer end of the quill supporting bore 50 and receives a relatively short flanged sleeve 52. The sleeve 52 serves both as a closure for the outer open end of the counterbore 51 and also as a bearing support for the lower end of the quill. With the sleeve 52 disposed in operative position in the outer end of the counterbore 51, it operates to form a cylindrical chamber 53, the lower end of which is defined by the axial end face 54 of the sleeve 52. The upper or inner end of the chamber 53 is defined by a shoulder 56 formed by the bore 50 and counterbore 51.

To lock the quill 45 in any axial position, a pair of threaded driven nut gears 60 and 61 are threadedly engaged on a portion of the quill 45 which is provided with a right-hand thread 62. As shown in FIGS. 1 and 2, the quill 45 is depicted in a partially extended position. To accommodate the thread 62 of the quill when the quill is moved outwardly or retracted inwardly into the headstock 27, the bore 50 is enlarged as at 63 to provide the necessary clearance.

As shown in FIG. 2 and diagrammatically in FIG. 3, the upper or left-hand driven nut gear 60 has been rotated on the quill in a manner that an axial end face 66 of the nut gear 60 is in tight engagement with the face of the inner or upper abutment 56. With this condition obtained, an undersurface 71 of the internal thread of the nut gear 60 is in tight frictional engagement with an upper surface 72 of the thread on the quill 45. Thus, an axial force applied to the quill 45, which would tend to move the quill axially inwardly, is counteracted by a resisting force from the abutment 56. This resisting force is transmitted to the quill through the nut gear 60 and through the engaged surfaces of the threads of the nut gear and quill.

In like manner, the lower nut gear 61 is rotated on the quill 45 in a manner to effect a tight engagement of the lower axial end face 74 of the nut gear 61 with the axial end face of the sleeve abutment 54. With tight engagement established between the nut gear 61 and the lower abutment 54, the upwardly facing surface 76 of the internal thread of the nut gear 61 is in tight frictional engagement with the undersurface 77 of the quill thread 62. Thus, a force tending to move the quill axially downwardly or outwardly of the headstock 27 is counteracted by a resisting force from the abutment 54. This resisting force is transmitted to the quill through the nut gear 61 and the engaged threads of the nut gear and the quill. It is apparent, therefore, that with the nut gear 60 positioned in engagement with the abutment 56 and the nut gear 61 positioned in engagement with the lower abutment 54, two oppositely acting forces are applied to the portion of the quill which is between the two spaced abutments in a direction to compress that portion of the quill 45 and the latter is positively locked against axial movement between the two spaced abutments 54 and 56.

To effect axial adjustment of the quill 45, the upper or left-hand driven nut gear 60 is rotated in the direction indicated by the directional arrow 155, which is a counterclockwise direction, as viewed from the outer or tool end of the spindle in FIG. 2. The counterclockwise rotation of the nut gear 60 will effect a release of the tight engagement previously established between the nut gear 60 and the abutment 56. Thus, the locking force between the abutment 56 and the quill 45 is now relieved. With the nut gear 60 in a released position, rotation of the lower or right-hand driven nut gear 61 will effect axial movement of the quill in one direction or the other depending upon the direction in which the nut gear 61 is rotated. To effect axial inward movement of the quill 45, the nut gear 61 must be rotated in the direction indicated by the directional arrow 156, which is a counterclockwise direction, as viewed from the outer or tool end of the spindle 35 in FIG. 2. On the other hand, a clockwise direction of rotation of the nut gear 61 will operate to move the quill axially outward of the headstock 27.

In effecting the axial adjusting movement of the quill 45 by operation of the lower nut gear 61, the released upper nut gear 60 will move axially with the quill. Thus, if the quill is being moved axially downwardly, the nut gear 60 moving with the quill will engage the operating lower nut gear 61. Upon this occurrence, the nut gear 60 would act as a jam nut locking the lower nut gear 61 to prevent its further rotation. On the other hand, rotation of the lower nut gear 61 in a direction to move the quill inwardly into the headstock 27 will cause the upper nut gear 60, in moving with the quill, to engage the abutment 56 thereby reestablishing the locking condition previously described to prevent further axial movement of the quill. It is therefore apparent that when the lower nut gear 61 is rotated in either direction to effect the axial movement of the quill, the released upper nut gear 60 must also be rotated in the same direction as the lower nut gear 61 is being rotated. This action will opearte to maintain the released upper nut gear 60 in the same released position relative to the lower nut gear 61 and the abutment 56 as the lower nut gear 61 is operated to effect axial movement of the quill 45.

With the quill 45 adjusted axially to the desired position, the upper nut gear 60 will be rotated in a clockwise direction, as viewed from the tool end of the spindle in FIG. 2, to engage the nut gear 60 with the abutment 56. This will re-establish the initial condition of the two nut gears 60 and 61 to effectively lock the quill in its adjusted position between the abutments 54 and 56.

To effect selective rotation of the upper nut gear and also to effect simultaneous rotation of both the upper and lower nut gears 60 and 61 in the same direction, a manual actuating arrangement is provided. As shown in FIG. 2, the periphery of the upper nut gear 60 is formed with left-hand gear teeth 80 which are meshingly engaged by the gear teeth of a left-hand driver gear 81. The driver gear 81 is supported within an enlarged recess (not shown) formed at the inner end of a horizontal bore 83 provided in the headstock 27, and disposed to the side of the vertical bore 50 in which the quill 45 is supported. The arrangement is such that the enlarged recess (not shown), in which the driver gear 81 is located, is adjacent to the bore 50 to provide a communicating opening (not shown) so that the driver gear 81 can mesh with the upper left-hand driven nut gear 60. Rotation of the driver gear 81 is effected by means of a shaft 84 that is journaled in a bearing sleeve 86 and extends inwardly into the bore 83 past the center line of the bore 50. The driver gear 81 is fixedly secured to the inner end of the rotatable actuating shaft 84 to be rotated thereby. The extreme inner end 87 of the shaft 84 is reduced and is journaled in a sleeve bearing 88 that is carried in the blind end (not shown) of the bore 83. The shaft 84 extends outwardly from the headstock 27 and is journaled in a bearing 89 carried in a suitable opening provided in a transverse bracket strap 91 of a supporting bracket 92 that is secured to the headstock 27. Rotation of the shaft 84, and thereby the driver gear 81, is effected by means of a hand crank (not shown) which is applied to an outer squared end 93 of the shaft 84.

A similar arrangement is provided for rotating the right-hand driven nut gear 61. A right-hand gear 96 is formed on the periphery of the nut gear 61 and is engaged by a right-hand driver gear 97. The driver gear 97 is carried on the inner end of a rotatable shaft 98 that is journaled at its inner end in a bearing 99 that is disposed in the blind end (not shown) of a horizontal bore 101 formed in the headstock 27 and which is disposed in spaced relationship directly below the bore 83. The shaft 98 extends outwardly of the headstock 27 and is supported at its outer end in a bearing 102 carried in a sleeve 103 that is disposed in the outer end of the bore 101. The extreme outer end of the shaft 98 is provided with a pinion 109 that is connected to the shaft by means of a key 111 and maintained in operative position by a snap ring 112.

The pinion 109 is arranged to have meshing engagement with a pinion 114, that is integrally formed on the inner end of an axially movable sleeve 115 which is slidably supported on the crank actuated shaft 84. With the arrangement provided, axial leftward or outward movement, as viewed in FIG. 2, of the sleeve 115 will serve to disengage the pinion 114 from engagement with the pinion 109. A key 116, engaged in an axially extending keyway provided in the axial opening of the sleeve, operates to establish a rotational drive between the shaft 84 and the sleeve 115. With the sleeve pinion 114 positioned in mesh with the pinion 109, rotation of the shaft 84 to effect rotation of the left-hand driver gear 81 will also effect rotation of the right-hand driver gear 97, but in the opposite direction. Since the left-hand driver gear 81 is in mesh with the left-hand gear portion 80 of the nut gear 60 and the right-hand driver gear 97 is in mesh with the right-hand gear portion 96 of the driven nut gear 61, the opposite rotation of the two driver gears 81 and 97 will operate to effect rotation of the two driven nut gears 60 and 61 in unison in one direction. Therefore, assuming that the driven nut gear 60 is in a released position relative to the abutment 56, simultaneous rotation of the two driven gears 60 and 61 will cause the quill to be moved axially in a selected direction depending upon the direction in which the crank actuated shaft 84 is rotated. Under this condition, the rotation of the lower driven nut gear 61 operates to move the quill axially, while the simultaneous rotation of the upper driven nut gear 60 maintains it in the same release position relative to the driven nut gear 61.

As previously mentioned, the upper driven nut gear 60 is rotated independently in one direction to effect the release of the quill, and in the opposite direction to lock the quill in an axially adjusted position. In order to accomplish the independent rotation of the upper nut gear 60, the sleeve pinion 114 is moved leftwardly, as viewed in FIG. 2, to disengage it from the pinion 109. Rotation of the shaft 84 will then produce rotation of the nut 60 while the nut 61 will remain idle. To facilitate axial movement of the sleeve 115, the left end of the sleeve, which extends outwardly of a pinion housing 118 that is formed integrally with the bracket 92, is provided with a knurled collar 119. The collar 119 is secured to the reduced outer end of the sleeve 115 by means of a set screw 121, in a well-known manner. When it is desired to disengage the pinion 114 from engagement with the pinion 109, the operator need only apply finger pressure to the knurled collar 119 to thereby pull the sleeve axially to the left, as viewed in FIG. 2. To maintain the pinion sleeve in disengaged position, a spring biased ball of a detent mechanism 122 is urged into a peripheral groove 126 formed on the periphery of the shaft 84. On the other hand, with the pinion sleeve 115 in full inward operative position wherein the pinion 114 is in mesh with the pinion 109, the detent ball is urged into a circular groove 127 also formed in the periphery of the shaft 84.

As previously mentioned, with the quill 45 supported for axial movement within the bore 50 of the headstock 27, a certain amount of clearance exists between the wall surface of the bore 50 and the peripheral surface of the quill 45. This clearance is sufficient to permit the quill to move laterally a limited amount within the bore 50. Of course, such movement of the quill is undesirable and is a material factor that contributes to the production of a poor finish on the surface of the workpiece. The quill 45 is therefore locked laterally within the bore 50 by a lateral force applying lock 130. The lateral locking mechanism 130, while simple in construction and operation, is nonetheless highly effective in eliminating lateral movement of the quill within the bore 50. As shown in FIG. 2, the lateral locking mechanism 130 comprises an arcuate shoe 131 which is disposed within a transverse slot 132 formed in the headstock 27. The slot 132 communicates with the bore 50 so that an arcuate surface 133 of the shoe 131 can be forcefully engaged with the peripheral surface of the quill 45. The shoe 131 is actuated in either direction by rotating a shaft 136 having a right-hand thread portion 137 engaged in a horizontal threaded opening 138 provided in the headstock 27. The horizontal opening 138 is formed so that its axis intersects the vertical axis of the quill 45. The inner end 139 of the threaded shaft 136 is of reduced diameter and loosely supports a self-adjusting thrust washer 142. The flat surface of the concave portion of the thrust washer 142 is disposed in engagement with a flat surface 144 of the arcuate shoe 131. The outer extending end 146 of the threaded shaft 137 is provided with a square end which receives a crank (not shown) which may be the same crank as used for rotating the shaft 84. As viewed in FIG. 1, clockwise rotation of the shaft 136 will operate to move the shaft axially inwardly towards the quill 45 to thereby apply a laterally acting force to the shoe 131 and the inner arcuate surface 133 of the shoe will forcefully engage with the adjacent peripheral surface of the quill 45. As a result, the quill 45 is locked to the headstock 27 and in effect becomes a fixed part of the headstock to avoid any extraneous movement of the quill 45 and its associated spindle 35 during a machining operation.

In operating the quill adjusting and locking the mechanism the lateral lock 130 is first released by rotating the shaft in a counterclockwise direction, as viewed from the left in FIG. 2. The counterclockwise rotation of the shaft 137 serves to retract the pressure shoe 131 away from the quill 45 to thereby relieve the lateral acting force applied to the quill. With the lateral lock 130 in released position, the pinion sleeve 115 is shifted leftwardly, as viewed in FIG. 2. This movement will serve to disengage the sleeve pinion 114 from the pinion 109. The shaft 84 will now be rotated in a counterclockwise direction, as viewed from the left in FIG. 2, and as indicated by the directional arrow 151. Since the driver gear 81 is connected to rotate with the shaft 84, the counterclockwise rotation of the shaft 84 will also effect a corresponding rotation of the driver gear 81 in a counterclockwise direction, as indicated by the directional arrow 153. Since the driver gear 81 is a left-hand gear and is in mesh with the left-hand external teeth 80 of the nut gear 60, counterclockwise rotation of the driver gear 81 will operate to rotate the driven nut gear 60 relative to the quill in the direction indicated by the directional arrow 155 which is a counterclockwise direction, as viewed from the tool carrying end of the spindle 35, in FIG. 2. The counterclockwise rotation of the nut gear 60 relative to the quill 45 will operate to move the nut gear 60 in a direction away from the abutment 56 to release the quill 45 for axial adjusting movement. One complete turn of the shaft 84 in a counterclockwise direction has been found to be sufficient to effect a release of the tight locking engagement between the nut gear 60 and the abutment 56 without moving the nut gear 60 into engagement with the lower driven nut gear 61.

The sleeve 115 is now moved inwardly or to the right, as viewed in FIG. 2, to establish a driving engagement between the pinion 114 and the pinion 109. To move the quill 45 inwardly into the headstock 27 the crank actuated shaft 84 is again rotated counterclockwise in the direction indicated by the directional arrow 151 thereby rotating the pinion 114 in a counterclockwise direction. Since the pinion 114 is in driving engagement with the pinion 109 that is keyed on the shaft 98, the pinion 109 and thereby the shaft 98, will be rotated in the opposite direction. With the crank actuated shaft 84 rotated in a counterclockwise direction and the shaft 98 rotating in a clockwise direction, the left-hand driver gear 81 and the right-hand driver gear 97 will be rotated in unison, in the same direction as their associated shafts 84 and 98, respectively. The simultaneous rotation of both of the driver gears 81 and 97 in the opposite directions, indicated by the respective directional arrows 153 and 154, will effect unitary rotation of their associated driven nut gears 60 and 61, respectively, in a counterclockwise direction, as viewed from the bottom in FIG. 2, and as indicated by the direction indicating arrows 155 and 156. Such unitary rotation in the same direction is obtained because the driver gear 81 and its cooperating gear 80 are left-hand gears. As a result, rotation of the driver gear 81 in the direction indicated by the directional arrow 153 will effect rotation of the driven nut gear 60 in the direction indicated by the associated directional arrow 155. However, the driver gear 97 is a right-hand gear and is in driving engagement with the right-hand gear portion of the nut gear 61. Therefore, rotation of the driver gear 97 in the direction indicated by the directional arrow 154 will effect rotation of the driven nut gear 61 in the direction indicated by the directional arrow 156.

Thus, with both nut gears 60 and 61 driven to rotate simultaneously in the counterclockwise direction, as viewed from the tool carrying end of the spindle 35 in FIG. 2, the released upper nut gear 60 will be rotatively driven but will remain in the same released position relative to the lower nut gear 61 and also with respect to the abutment 56. On the other hand, the counterclockwise direction of rotation of the nut gear 61 will effect axial inward movement of the quill 45 in the direction indicated by the directional arrow 157. This is true, because the thread portion 62 on the quill 45 is a right-hand thread, and as illustrated in FIG. 3, with the lower nut gear 61 in engagement with the lower abutment 54, the nut gear 61 is prevented from moving axially downwardly. However, rotation of the nut gear 61 in a counterclockwise direction, as indicated by the directional arrow 156, on the right-hand thread portion 62 of the quill, will cause an upwardly acting force to be developed between abutment 54 and the nut gear 61. This force is transmitted by the nut gear 61 through the upper surface 76 of its internal right-hand thread to the under or lower surface 77 of the right-hand thread 62 on the quill 45. As a result, the quill 45 will be moved in the direction indicated by the directional arrow 157, inwardly into the headstock 27.

When the quill 45 has been retracted into the headstock 27 to a desired position, it must be locked so as to be axially immovable relative to the headstock 27. This is accomplished by moving the sleeve 115 axially outwardly or to the left, as viewed in FIG. 2. Leftward movement of the sleeve 115 will operate to disengage the pinion 114 from the pinion 109 to interrupt the drive connection therebetween. Consequently, the shaft 84 may be rotated in a clockwise direction, as viewed from the left in FIG. 2, without effecting rotation of the shaft 98. As the shaft 84 is rotated in a clockwise direction, the left-hand driver gear 81 is also rotated in the same direction, which is a clockwise direction and is opposite to the direction that is indicated by the directional arrow 153. Rotation of the driver gear 81 in a clockwise direction will operate to rotate the left-hand driven nut gear 60 in a clockwise direction, as viewed from the tool carrying end of the spindle 35 in FIG. 2, in the direction opposite to the direction indicated by the directional arrow 155. Therefore, since the nut gear 60 is rotating in a clockwise direction on the right-hand thread portion 62 of the quill 45, the nut gear 60 will move upwardly relative to the quill 45 into tight engagement with the abutment 56. With the upper nut gear 60 in tight engagement with the abutment 56, the initial condition illustrated in FIG. 3 is again obtained and the quill 45 is positively locked against axial movement in either direction between the two abutments 54 and 56.

It is apparent that to effect axial outward or downward movement of the quill 45 relative to the headstock 27, the crank actuated shaft 84 will be rotated in a clockwise direction, as viewed from the front of the machine in FIG. 1. Clockwise rotation of the shaft 84 will result in the two nut gears 60 and 61 being rotated simultaneously in a clockwise direction, as viewed from the tool end of the spindle in FIG. 2. Under this condition, the weight of the quill 45 and its associated spindle structure is imposed upon the nut gear 61 to prevent it from moving axially upwardly relative to the quill 45. Therefore, since the nut gear 61 is prevented from moving axially upwardly and is rotatably driven in a clockwise direction, the quill 45 will be moved downwardly or outwardly of the headstock 27.

With the quill 45 locked in axially adjusted position, the lateral lock 130 is actuated, as previously described, to apply a lateral force to the quill. This lateral force is applied to the quill 45 in the direction of the table movement and is operative to prevent lateral movement of the quill 45 within the bore 50 of the headstock.

From the foregoing detailed description of the illustrative structure set forth herein to disclose the principles of the invention, it is apparent that there has been provided an improved adjusting and locking apparatus for the axially positionable rotatable spindle supporting quill of a machine tool which incorporates a single actuating arrangement for rotating one of the nut gears relative to the other for locking the quill in position and which is also operative to effect the simultaneous rotation of both of the nut gears in the same direction selectively for effecting a desired movement of the quill.

Although the invention has been described in considerable detail in order to fully disclose the invention and practical use thereof, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing description, I hereby claim as my invention:

1. In a machine tool;
   a frame having a bore provided with an enlarged portion;
   a member supported in the bore of the frame for axial movement;
   a thread formed on the periphery of said member;
   a pair of spaced abutments carried by said frame in the enlarged portion of the bore;
   a first nut threadedly engaged on said member and adapted to be moved relative to said member into and out of engagement with one of said abutments;
   a second nut threadedly engaged on said member in spaced relationship to said first nut and disposed in engagement with the other of said abutments, said first and second nuts cooperating to apply oppositely directed forces to said member to lock said member axially between said abutments;
   a first gear drive operably connected to said first nut for effecting its rotation to move it into or out of forceful engagement with said one abutment selectively, the rotation of said first nut out of engagement with said one abutment operating to relieve the force applied by it to said member thereby releasing the member for axial movement;
   a second gear drive operably connected to said second nut to effect its rotation in a selected direction to effect the axial movement of said member in one direction or the other depending upon the direction of rotation of said second nut;
   a single actuator operable to operate said first gear drive in a direction to effect rotation of said first nut away from said one abutment; and,
   interconnecting means selectively engageable to connect said second gear drive to said single actuator in a manner that said single actuator is operable to operate said first and second gear drives simultaneously for effecting the simultaneous rotation of said first and second nuts in the same direction and at the same rate to effect axial movement of said member.

2. In a machine tool having a relatively fixed member and a member supported for axial movement by said relatively fixed member;
   a pair of spaced abutments carried by said relatively fixed member;
   a first nut element threadedly engaged with said axially movable member so that it may be independently rotated into engagement with one of said said abutments in a manner to transmit a force between the one abutment and the movable member to prevent axial movement of the movable member in one axial direction;
   a second nut element threadedly engaged with said axially movable member in spaced relationship to said first nut element and disposed in engagement with the other of said abutments in a manner to transmit a force between said other abutment and the movable member to prevent axial movement of the movable member in the opposite axial direction;
   a first drive means operably connected to said first nut element to effect independent rotation of said first nut element relative to said movable member for moving said first nut element out of engagement with said one abutment; and,
   a second drive means operably connected to said second nut element to effect movement of said second nut element relative to said movable member for transmitting a force between said other abutment and said movable member to effect axial movement of said movable member relative to said fixed member.

3. In a machine tool having a headstock provided with a bore;
   a cutter carrying quill carried in the bore of said headstock for axial movement;
   a first and second positive stop disposed within the bore of said headstock;
   a first and second nut threadedly engaged in spaced relationship on said quill for movement into and out of engagement with said first and second positive stops respectively;
   a first and second gear formed on said first and second nuts respectively;
   a first and second driver gear respectively engaged with said first and second gears of said nuts;
   a first drive means connected to rotate said first driver gear to effect rotation of said first nut on said quill in a direction to move said first nut out of engagement with the associated first positive stop; and,
   a second drive means selectively connectable to said first drive means to be actuated thereby, said second drive means being connected to rotate said second driver gear to effect rotation of said second nut relative to said quill while said second nut is maintained in engagement with the associated second positive stop to thereby effect axial movement of said quill.

4. In a machine tool having a fixed member and a movable member supported by the fixed member for axial movement relative to the fixed member;
   a pair of spaced abutments carried by the fixed member;
   a first force applying element adjustably connected to the movable member and disposed for independent movement into and out of engagement with one of said abutments;
   a second force applying element adjustably connected to said movable member in spaced relationship to said first force applying element, said second force applying element being disposed in engagement with the other of said abutments;
   means for selectively adjusting said first force applying element relative to said movable member to move said force applying member independently into or out of engagement with the said one abutment; and,
   means for effecting a simultaneous adjustment of both of said force applying members relative to the movable member in a manner to maintain said first force applying element out of engagement with the said one abutment while said second force applying element is maintained in engagement with the other of said abutments, whereby the adjustment of said second force applying element relative to the movable member while in engagement with the other of said abutment operates to move the movable member axially.

5. In a machine tool having a base;
a headstock supported by the base and having a bore;
a tool supporting quill having a peripheral thread supported in the bore of said headstock for axial movement;
a pair of spaced abutments carried within the bore of said headstock;
a pair of nut elements threadedly engaged on said quill, each of said nut elements being disposed in engagement with an associated abutment to prevent axial movement of said quill;
drive means operably connected to produce independent rotation of one of said nut elements relative to said quill in a direction to move the one nut element out of engagement with its associated abutment; and,
means selectively engageable with said drive means to be actuated thereby to produce rotation of both of said nut elements in unison in the same direction to produce axial movement of said quill in a selected axial direction depending upon the direction in which said nut elements are rotated.

6. In a machine tool having a base;
a horizontally disposed work supporting table carried by the base;
a headstock having a vertical bore supported by the base for movement in a horizontal plane relative to said table;
a tool supporting quill having a peripheral thread supported in the bore of said headstock for axial movement towards and away from said table;
a releasable force applying member carried by said headstock in position to apply a lateral force to said quill when actuated in a direction parallel to the direction in which said table and headstock are movable relative to each other, said laterally applied force operating to prevent lateral movement of the quill within the bore of said headstock;
a pair of abutments carried by said headstock in spaced relationship within the bore of said headstock;
a pair of nut elements threadedly engaged on said quill, each of said nut elements being disposed in engagement with an associated one of said abutments, said nut elements being operable when so engaged to prevent axial movement of said quill;
drive means operably connected to produce rotation of one of said nut elements relative to said quill in a direction to move the said one nut element out of engagement with its associated abutment; and,
means selectively engageable with said drive means to be actuated thereby to rotate said nut elements in unison in the same direction;
whereby the independent rotation of the one nut element will operate to move the one nut element to a released position and the unitary rotation of both nut elements in the same direction will serve to maintain said one nut element in its released position out of engagement with its associated abutment and while the rotation of said second nut element will operate to move the quill axially in a direction dependent upon the direction in which both nut elements are rotated.

7. In a machine tool;
a work support and a headstock respectively carried for relative movement in a horizontal plane, said headstock being provided with a vertical bore;
a tool carrying quill having a peripheral thread supported in the bore of said headstock for axial movement towards and away from said work support;
a releasable force applying member carried by said headstock in position to apply a lateral force to the periphery of said quill in a direction parallel to the direction in which said work support and said headstock are relatively movable to thereby prevent lateral movement of the quill within the bore of said headstock;
a pair of abutments carried by said headstock and disposed in spaced relationship within the bore of said headstock;
a first axial force applying member disposed within the bore of said headstock and adjustably connected to said quill and adapted to be moved into and out of engagement with one of said abutments, said first axial force applying member being operable when engaged with said one abutment to apply an axial force in one direction to said quill;
a second axial force applying member disposed within the bore of said headstock in spaced relationship to said first axial force applying member, said second axial force applying member being adjustably connected to said quill and positioned in engagement with the other of said abutments, said second axial force applying member being operable to apply an axial force to said quill in the opposite direction with respect to the force that is applied to said quill by said first axial force applying member;
adjusting means for selectively adjusting said first axial force applying member relative to said quill to relieve the axial force applied to said quill and thereby release said quill for axial movement; and,
means operable to connect said adjusting means to said second axial force applying member for adjusting said second axial force applying member relative to said quill for effecting an operative forceful engagement between said second axial force applying member and the other of said abutments to develop a reaction force which is transmitted to said quill for effecting its axial movement.

8. In a machine having a member movably supported by said frame;
drive means carried by said frame and connected to said movable member for driving the latter in its path of travel;
first actuating means independently connected to said drive means for independently actuating the latter in a manner to lock the movable member in a desired position relative to said frame; and,
second actuating means connected to said drive means and arranged to be selectively engaged with said first actuating means to be activated thereby for co-operation with said first actuating means to actuate said drive means in a manner to drive said movable member in its path of travel.

References Cited
UNITED STATES PATENTS 2,396,632 3/1946 Bennett et al. _____ 90—22
3,003,472 10/1961 Ferris et al. _____ 90—16 X LEONIDAS VLACHOS, Primary Examiner U.S. Cl. X.R.
72—441; 90—11